United States Patent Office 3,520,935
Patented July 21, 1970

3,520,935
HYDROGENATION OF CINNAMIC ALDEHYDE
Joseph T. Arrigo, Mount Prospect, Nils J. Christensen, Palatine, Richard L. Chrysler, Hinsdale, and Allen K. Sparks, Des Plaines, Ill., assignors to Universal Oil Products Company, Des Plaines, Ill., a corporation of Delaware
No Drawing. Filed May 1, 1969, Ser. No. 821,091
Int. Cl. C07c 47/48
U.S. Cl. 260—599                    9 Claims

ABSTRACT OF THE DISCLOSURE

A continuous process for the selective hydrogenation of cinnamic aldehyde compounds to the corresponding dihydrocinnamic aldehyde compounds by hydrogenation in contact with a catalyst composite of palladium and alkali metal component catalyst.

BACKGROUND OF THE INVENTION

Certain dihydrocinnamic aldehyde compounds, also referred to as hydrocinnamic aldehyde compounds are extremely desirable because of their characteristic odor profile. These dihydrocinnamic aldehyde compounds conveniently are prepared by the hydrogenation of the corresponding unsaturated aldehyde. However, the selective hydrogenation of the carbon-carbon unsaturation is difficult to accomplish without the simultaneous hydrogenation of the aldehyde group to the alcohol. The alcohol derivatives dilutes and may otherwise adversely affect the desired odor characteristics of the aldehyde and, therefore, the presence of the alcohol must be kept to a minimum. This problem has been recognized in the prior art and has been the subject of considerable research. However, up to the present time it appears that the best solution requires batch type process utilizing a two-phase system of aqueous and organic liquids, further complicated by solid catalyst particles and gaseous hydrogen, all of which must be intimately contacted. This process suffers the objections inherent in batch type systems and further involves the difficulties of handling the different liquids, gaseous hydrogen and solid catalyst particles. In addition, the batch operation, of necessity, must be terminated after each run and the liquid reaction mixture must be separated from the solid catalyst. Also, it is necessary to further treat the effluent mixture to remove solvent and to recover the desired product.

DESCRIPTION OF THE INVENTION

The objections hereinbefore set forth to the batch process are avoided by the novel process of the present invention which effects the selective hydrogenation in a continuous manner. As hereinbefore set forth, the selective hydrogenation of the carbon-carbon unsaturation in the cinnamic aldehyde compound is difficult to accomplish without the simultaneous hydrogenation of the carbonyl group to the corresponding alcohol. After considerable research, it now has been found that this selective hydrogenation may be effected in a continuous manner when using a particular catalyst composition.

In one embodiment the present invention relates to a continuous process for the selective hydrogenation of a cinnamic aldehyde compound to the corresponding dihydrocinnamic aldehyde compound by effecting in a continuous process the hydrogenation in contact with a catalyst composite of palladium and an alkali metal component.

In a specific embodiment the present invention relates to a continuous process for the selective hydrogenation of p-t-butyl-alpha-methylcinnamaldehyde to p-t-butyl-alpha-methyldihydrocinnamaldehyde which comprises effecting in a continuous process the hydrogenation at a temperature of from about 50° to about 150° C. under a hydrogen pressure of from about 50 to about 2000 p.s.i.g. in contact with a catalyst composite of palladium, alumina and lithium oxide.

As hereinbefore set forth, the process of the present invention is effected in contact with a catalytic composite of palladium and an alkali metal component. The catalyst composite is prepared in any suitable manner and preferably is of the supported type. Any suitable support or carrier may be employed including alumina, charcoal, etc. Alumina is particularly preferred and, while any suitable alumina may be employed, the alumina more particularly is substantially pure alumina as prepared by the digestion of aluminum pallets with a mineral acid such as hydrochloric acid or sulfuric acid. The alumina preferably is formed into particles of uniform size and shape such as spheres, pellets, etc. and dried and calcined. While the uniform particles are preferred, it is understood that the alumina also may be in the form of irregular size and shape. In a preferred method, the palladium component is composited with the shaped aluminum particles, which is effected in any suitable manner. In one method this is effected by soaking the alumina particles in a suitable palladium containing solution, as, for example, palladium chloride, and then drying, generally at a temperature of from about 100° to about 260° C., followed by, when desired, calcination at a temperature of from about 400° to about 650° C. The impregnation of the palladium component is controlled to composite the palladium in a concentration within the range of from about 0.1% to about 6% by weight and preferably from about 0.75% to about 4% by weight of the final catalyst, although lower and more particularly higher concentrations may be used when desired. While it is believed that the palladium is present in the catalyst as the metal, it is understood that it may be present as a compound thereof.

The palladium-alumina composite prepared in the above manner then is treated to composite the alkali metal component therewith. A particularly preferred component is lithium oxide. Other alkali metal components include sodium, potassium, rubidium and cesium, although the last two are more expensive and therefore generally are not preferred. The alkali metal component may be composited in any suitable manner as, for example, by soaking the palladium-alumina particles in a solution of a suitable salt of the alkali metal including the nitrate, acetate, carbonate, bicarbonate, phosphate, etc. In a particularly preferred manner, the palladium-alumina particles are soaked in a solution of lithium nitrate, followed by drying and calcining at the temperature hereinbefore set forth and for sufficient time to effect the desired impregnation. The alkali metal component, determined as the metal, will be in a concentration of from about 0.2% to about 10% and preferably from about 1% to about 6% by weight of the final catalyst, although lower and more particularly higher concentrations may be used when desired. Although it is believed that the alkali metal component is present in the oxide form, the concentrations as hereinbefore set forth for this component are expressed on the basis of the free metal. However, it is understood that the alkali metal component may be present in any other suitable form.

The alumina generally is considered as an inert support or carrier. However, in combination with the palladium and alkali metal component, the alumina may exert a contributing catalytic effect. Furthermore, the palladium component is peculiar for this reaction and the combination thereof with the alkali metal component results in a mutually contributing effect to produce the desired results. Furthermore, the particular catalyst composite is coordinated with the preferred operating conditions to be hereinafter set forth to obtain the desired high conversion and high selectivity.

As hereinbefore set forth, the process of the present invention is effected in a continuous system and thus enjoys the inherent benefits of economy, convenience and uninterrupted operation. The process is readily effected by disposing the catalyst as a fixed bed in a reaction zone and passing the reactants at the desired temperature and pressure, either together or separately and either in upward or downward flow, through the catalyst bed. The hydrogenation is effected at any suitable temperature, which generally will be within the range of from about 50° to about 150° C. and preferably is within the range of from about 70° to about 110° C., utilizing a hydrogen pressure of from about 50 to about 2000 and preferably from about 200 to about 1500 p.s.i.g. The charge rate generally will be within the range of from about 0.05 to about 5 LHSV (liquid hourly space velocity), based on the cinnamic aldehyde compound charged, and preferably is within the range of from about 0.15 to about 1.5 LHSV. The LHSV is defined as the volume of charge per volume of catalyst per hour.

The effluent products from the reaction zone are passed into a separator, wherefrom excess hydrogen is vented or recycled, in all or in part, to the reaction zone and wherefrom the liquid products then are passed into suitable recovery equipment. When the cinnamic aldehyde charge is solid at ambient temperature, it may be heated to melting and pumped in this manner into the reaction zone or, when desired, the cinnamic aldehyde may be dissolved in the suitable solvent and charged to the process in this manner. Any suitable solvent may be used, including alcohol, particularly methanol, ethanol, propanol, etc., hydrocarbon, particularly benzene or toluene, etc. As hereinafter set forth it is another advantage to the present invention that a solvent generally is not used and thus avoids the necessity of subsequent separation of the solvent from the desired product.

As hereinbefore set forth the present invention is used for the selective hydrogenation of cinnamic aldehyde compounds. The cinnamic aldehyde compound may contain substituents in the side chain and/or in the ring, particularly substituents comprising lower alkyl groups and thus selected from methyl, ethyl, propyl and butyl. In another embodiment the substituents may be selected from ethoxy, methylenedioxy, ethylenedioxy, etc. Illustrative compounds which are selectively hydrogenated in accordance with the present invention include cinnamic aldehyde, alpha-methylcinnamic aldehyde, p-methylcinnamic aldehyde, m-methylcinnamic aldehyde, p-methyl-alpha-methylcinnamic aldehyde, p-ethyl-alpha-methylcinnamic aldehyde, p-isopropyl-alpha-methylcinnamic aldehyde, p-tertiary-butyl-alpha-methyl-cinnamic aldehyde, alpha-ethylcinnamic aldehyde, p-isopropyl-alpha-ethylcinnamic aldehyde, p-methoxycinnamic aldehyde, p-methoxy-alpha-methylcinnamic aldehyde, 3,4-methylenedioxy-alpha-methylcinnamic aldehyde, o-methoxycinnamic aldehyde, m-methoxycinnamic aldehyde, etc.

The following examples are introduced to illustrate further the novelty and utility of the present invention but not with the intention of unduly limiting the same.

Example I

Both the selectivity and the conversion are important in producing the desired product of high purity. Selectivity, as used in the present examples, is defined as the weight of desired product divided by the weight of the charge converted multiplied by 100. Conversion is defined as the weight of the charge converted, divided by the weight of the charge, multiplied by 100. Accordingly, the objective is to obtain maximum selectivity at essentially complete conversion.

A series of runs was made in a continuous manner in which the cinnamic aldehyde compound and hydrogen were passed downward through an externally heated reaction zone containing a bed of the catalyst. The cinnamic aldehyde compound was p-t-butyl-alpha-methylcinnamaldehyde. The effluent products from the reaction zone were passed into a high pressure receiver, wherefrom hydrogen was vented. The liquid product was analyzed by GLC to determine the conversion and selectivity as specified above.

In the first example the catalyst was a composite of 0.75% by weight of palladium, alumina and 2% by weight of lithium as the oxide. The catalyst was used in the form of 20–40 mesh particles. In this run, the p-t-butyl-alpha-methylcinnamaldehyde was used as a 10% by weight solution in methanol. The reaction was effected at a temperature of 75° C., a hydrogen pressure of 1000 p.s.i.g., and LHSV (based on the cinnamic aldehyde) of 0.15, with the hydrogen being charged at a rate of 2.1 standard cubic feet per hour. Based on GLC analysis, it was found that the conversion was 100 and the selectivity was 95.

Example II

As part of the research program, a series of batch runs was made to hydrogenate p-t-butyl-alpha-methylcinnamaldehyde. These batch runs were made in a modified Fischer-Porter apparatus, using the cinnamic aldehyde compound dissolved in methanol and under 375 p.s.i.g. initial hydrogen pressure. The reactants plus added catalyst were stirred at 25° C. until the cinnamic aldehyde compound was substantially completely converted.

When using the palladium-alumina catalyst containing 2% lithium as the oxide which, is the same catalyst as described in Example I, the conversion was 100 and the selectivity was 99. This demonstrates that substantially the same results were obtained in the continuous process without the inherent disadvantages of the batch system.

Another batch run was made using a catalyst containing 2% palladium on alumina (no lithium). This run was made under the same conditions as described above. The conversion amounted to 79 and the selectivity was only 13. This demonstrates the unique effect of using the catalyst containing the alkali metal component. Other batch runs were made using catalysts containing 0.5% palladium on alumina, 1.5% palladium on alumina and 5% palladium composited with barium sulfate. These produced conversions of 77, 83 and 98, respectively, and selectivities of 58, 70 and 29, respectively. Here again the importance of the alkali metal component is evident in the poor results obtained in its absence.

Example III

Another continuous run was made in the same manner as described in Example I except that the p-t-butyl-alpha-methylcinnamaldehyde was charged in an undiluted molten form. This run was made at a reaction temperature of 99° C., a hydrogen pressure of 1000 p.s.i.g. and a LHSV of 0.19. Conversion amounted to 100 with a selectivity of 93.

It will be noted that these results compare favorably with those obtained in the run of Example I and this demonstrates that the solvent may be omitted and thereby further economy is effected in avoiding the necessity of separating the solvent from the product.

Example IV

Another continuous run was made in substantially the same manner, in which the catalyst was a composite of 2% palladium and 4.5% lithium (as oxide) with alumina. This run was made at a temperature of 89° C., a hydrogen pressure of 1000 p.s.i.g. and a LHSV of 0.25. The conversion was 100 with a selectivity of 94.

Example V

Another continuous run was made using the catalyst composite described in Example IV except the temperature was 100° C., the hydrogen pressure was 200 p.s.i.g. and the LHSV was 0.43. In this run the conversion was 100 with a selectivity of 95.

Example VI

Another continuous run was made in the same manner as described above except that the catalyst comprised 4% palladium and 6% lithium (as oxide) composited with alumina. This run was made at a temperature of 70° C., a hydrogen pressure of 1000 p.s.i.g. and an LHSV of 0.66. The conversion was 100 with a selectivity of 93.

Example VII

The cinnamic aldehyde compound of this example is p-isopropyl-alpha-methylcinnamaldehyde and is subjected to selective hydrogenation in a continuous process as hereinbefore described. The hydrogenation is effected at a temperature of 95° C., and LHSV of 0.22 and a hydrogen pressure of 750 p.s.i.g.

Example VIII

Cinnamaldehyde is subjected to selective hydrogenation in a continuous process as hereinbefore described. The hydrogenation is effected at a temperature of 90° C., a LHSV of 0.3 and a hydrogen pressure of 400 p.s.i.g.

We claim as our invention:

1. A process for the selective hydrogenation of a cinnamic aldehyde compound to the corresponding dihydrocinnamic aldehyde compound which comprises effecting the hydrogenation in a continuous process in contact with a catalyst composite of palladium, alumina and a lithium component wherein the lithium component is in a concentration determined as the free metal, of from about 0.2% to about 10% by weight of the catalyst composite at a temperature of from about 50° to about 150° C. and under a hydrogen pressure of from about 50 to about 2000 p.s.i.g.

2. The process of claim 1 in which said compound is p-lower alkyl cinnamaldehyde.

3. The process of claim 1 in which said compound is alpha-lower alkyl cinnamaldehyde.

4. The process of claim 1 in which said compound is p-lower alkyl-alpha-lower alkyl cinnamaldehyde.

5. The process of claim 4 in which said compound is p-tert-butyl-alpha-methylcinnamaldehyde.

6. The process of claim 4 in which said compound is p-isopropyl-alpha-methylcinnamaldehyde.

7. The process of claim 1 in which said palladium is in a concentration of from about 0.1% to about 6% by weight of the catalyst composite.

8. The process of claim 1 in which said lithium is present as lithium oxide.

9. The process of claim 1 in which the temperature is within the range of from about 70° to about 110° C. and the hydrogen pressure is from about 200 to about 1500 p.s.i.g. and the liquid hourly space velocity, based on the cinnamic aldehyde compound charged, is from 0.15 to about 1.5.

References Cited

UNITED STATES PATENTS

| 1,844,013 | 2/1932 | Knorr et al. | 260—599 |
| 2,875,131 | 2/1959 | Carpenter et al. | 260—599 XR |
| 3,280,192 | 10/1966 | Levy et al. | 260—599 |
| 3,372,199 | 3/1968 | Rylander et al. | 260—599 |
| 3,415,884 | 12/1968 | Kuwata et al. | 260—599 |

FOREIGN PATENTS

| 816,151 | 7/1959 | Great Britain. |

BERNARD HELFIN, Primary Examiner

U.S. Cl. X.R.

260—600, 340.5, 340.7; 252—466